United States Patent [19]

Tsujimoto

[11] Patent Number: 5,345,476
[45] Date of Patent: Sep. 6, 1994

[54] INTERFERENCE CANCELLER WITH FEEDFORWARD TRANSVERSAL FILTER HAVING SWITCHED TAP-GAIN COEFFICIENTS

[75] Inventor: Ichiro Tsujimoto, Tokyo, Japan

[73] Assignee: NEC Corporation, Japan

[21] Appl. No.: 45,555

[22] Filed: Apr. 9, 1993

[30] Foreign Application Priority Data

Apr. 9, 1992 [JP] Japan .................................. 4-089061

[51] Int. Cl.[5] ........................ H03H 7/30; H03H 7/40; H03K 5/159
[52] U.S. Cl. ........................................ 375/14; 375/99; 364/724.2; 333/18
[58] Field of Search .................... 375/11, 12, 13, 14, 375/15, 16, 99; 364/724.19, 724.2; 333/18

[56] References Cited

U.S. PATENT DOCUMENTS

| | | | |
|---|---|---|---|
| 4,870,657 | 9/1989 | Bergmans et al. | 375/99 X |
| 4,905,254 | 2/1990 | Bergmans | 375/14 |
| 4,953,183 | 8/1990 | Bergmans et al. | 375/14 X |

OTHER PUBLICATIONS

Ichiro Tsujimoto, "A New decision Feedback Equalization Method For Digital Radio," C&C Systems Research Laboratories, NEC Corporation 1990.

*Primary Examiner*—Stephen Chin
*Assistant Examiner*—Bryan Webster
*Attorney, Agent, or Firm*—Ostrolenk, Faber, Gerb & Soffen

[57] ABSTRACT

An adaptive feedforward equalizer (12) has switched (N−1) tap-gain coefficients and a fixed tap-gain coefficient for the reference delay-line tap to operate on an incoming IF or baseband signal according to a first error signal ($\epsilon_1$) representative of the difference between the input and output of a decision circuit (15). All tap-gain coefficients are active in the absence of an interference from an undesired source to cancel precursor distortion. The (N−1) tap-gain coefficients are nullified when such an interference is detected to reduce its precursor-cancelling capability. A first feedback equalizer (17) operates on the output of the decision circuit according to the first error signal to cancel postcursor distortion. A second feedback equalizer (18) nonlinearly filters the output of the decision circuit according to a second error signal ($\epsilon_2$) and generates an estimate of a desired component of the output of the feedforward equalizer. The outputs of the second feedback equalizer (18) and the feedforward equalizer (12) are combined to produce the second error signal, or an estimate of an undesired component of the output of the feedforward equalizer. In the presence of the interference, the desired component estimate ($\epsilon_2$) is combined with the outputs of the feedforward equalizer (12) and the first feedback equalizer (17) to produce an equalized signal for coupling to the decision circuit.

4 Claims, 3 Drawing Sheets

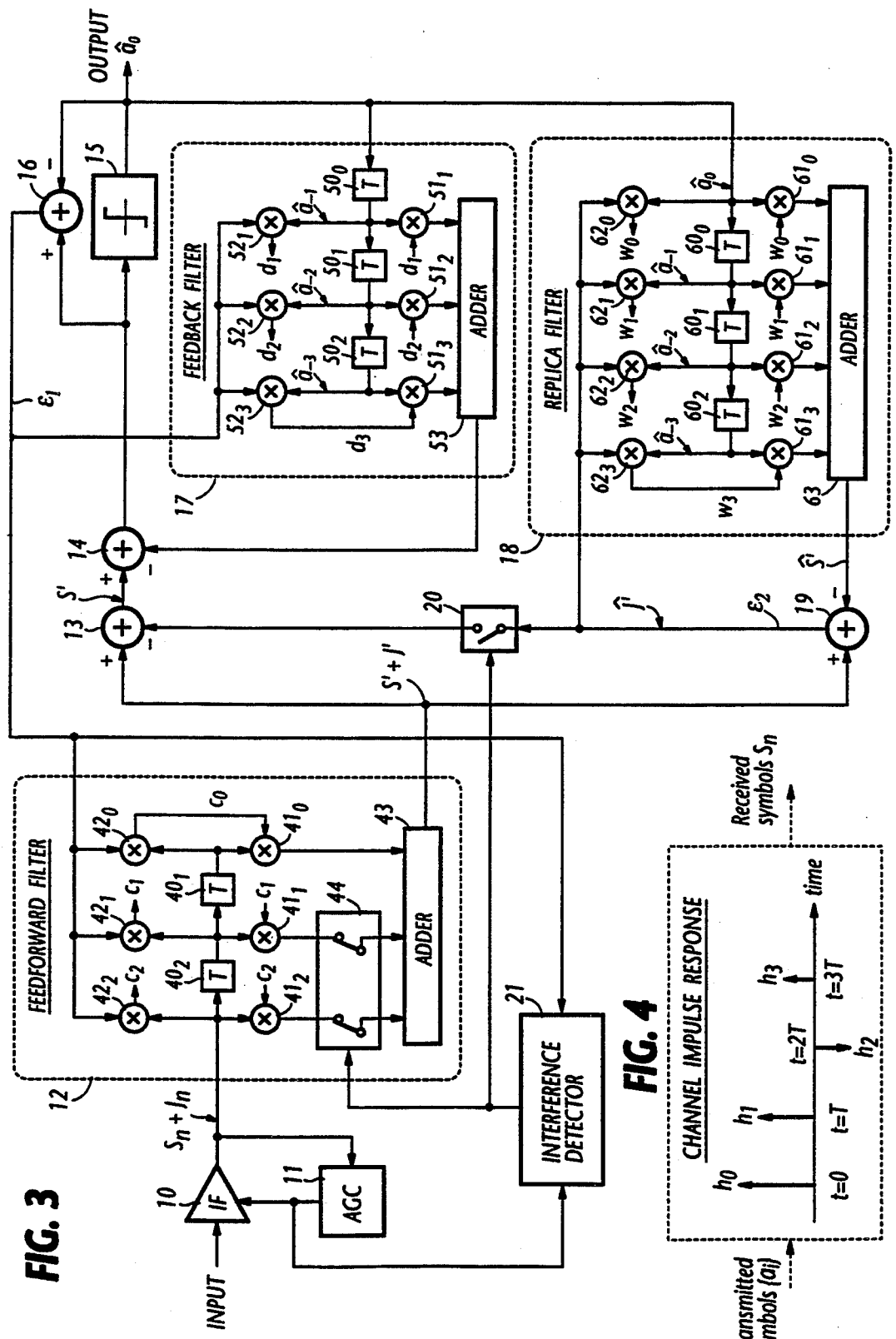

INTERFERENCE CANCELLER WITH FEEDFORWARD TRANSVERSAL FILTER HAVING SWITCHED TAP-GAIN COEFFICIENTS

BACKGROUND OF THE INVENTION

1. Field of the Invention

The present invention relates generally to interference cancellers, and more specifically to an interference canceller for cancelling wideband frequency interferences from an undesired signal source and adaptive equalization of signal affected by multipath distortions.

2. Description of the Related Art

A prior art interference canceller includes primary and auxiliary antenna systems. As shown in FIG. 1, an input signal from the primary antenna system is applied to a subtractor 1. The primary input contains a desired signal S and a wideband interference component J, both of which are affected by multipath distortions. An input signal J' from the auxiliary antenna is filtered by an adaptive linear transversal filter 2 and subtracted from the primary input by subtractor 1, whose output is coupled to a subtractor 3 where it is subtracted from a training sequence supplied from a reference pulse generator 4. The training sequence is a series of pulses that occur at the same rate as burst signals that appear at periodic intervals in the desired signal. The subtractors 1, 3, the linear filter 2 and the reference pulse generator 4 constitute a circuit known as an adaptive noise canceller and a detailed description of the canceller is given in "Adaptive Signal Processing" by Bernard Widrow and Samual D. Stearns, Prentice-Hall, Inc, 1985.

Signals J and J' are considered as different versions of the same signal transmitted from a common undesired source as they have travelled over different propagation paths and therefore affected by different channel impulse response characteristics. The tap-gain coefficients of linear transversal filter 2 are constantly updated with the output of subtractor 3 according to the least mean square (LMS) algorithm and the filter output is applied to subtractor 1 as an estimate $\hat{J}$ of the wideband interference J. By subtracting the interference estimate $\hat{J}$ from the primary input, wideband interference J is cancelled at the output of subtractor 1, allowing the desired signal S to be applied to a decision feedback equalizer comprising a feedforward filter 5, a subtractor 6, a decision circuit 7, an error detector 8 and a feedback transversal filter 9, where it is adaptively equalized to remove intersymbol interference caused by multipath fading.

However, the operation of the prior art interference canceller is satisfactory only when the auxiliary input does not contain a component of the desired signal. If a desired component is contained in the auxiliary input, it would cause an additional multipath distortion or a reduction of the desired signal of the primary input by mutual cancellation. Due to the use of a linear transversal filter for filtering the auxiliary input, receiver noises are distributed along the taps of the linear filter and are mixed with the primary input and the amplification of the noises prevents its tap-gain coefficients from converging to a value sufficient to provide interference cancellation. Additionally, the use of the trailing sequence at burst intervals prevents high speed updating of the tap gain coefficients if the multipath fading of an interference signal varies at a rate higher than the rate at which the training sequence is generated.

SUMMARY OF THE INVENTION

It is therefore an object of the present invention to provide an interference canceller capable of cancelling multipath fading interference without causing cancellation of desired signals and eliminating the noise enhancement problem without using a training sequence.

The object of the present invention is obtained by detecting an interference signal transmitted from an undesired source by taking the difference between a received signal and a replica of the desired signal. A feedforward equalizer operates on a signal received by an antenna and produces an equalized feedforward output signal. The feedforward equalizer comprises (N−1) delay-line elements connected in series to define N delay-line taps for producing successively delayed versions of the received signal at the N delay-line taps, N multipliers for operating on the delayed signals at the delay-line taps, N correlators responsive to a first error control signal for modifying signals at the delay-line taps for respectively supplying tap-gain signals to the multipliers, summing means for combining outputs from the N multipliers into the equalized feedforward output signal, and means for nullifying the outputs of (N−1) ones of the N multipliers in response to the gate control signal. A data recovery, or decision circuit makes a decision on an equalized desired signal to recover the transmitted data. First and second feedback equalizers are provided. The first feedback equalizer operates on decision output signals from the data recovery circuit in accordance with the first error control signal and the second feedback (replica filter) equalizer nonlinearly filters decision output signals from the data recovery circuit in accordance with a second error control signal and generate an estimate of a desired component of the equalized feedforward output signal. A first combiner combines outputs from the second feedback equalizer and the feedforward equalizer to supply an estimate of an undesired component of the equalized feedforward output signal to the second feedback equalizer as the second error control signal. A second combiner combines outputs from the first combiner, the feedforward equalizer and the first feedback equalizer to produce a signal corresponding to the equalized desired signal for the data recovery circuit. An error detector is responsive to a difference between the outputs of the second combiner and the data recovery circuit for generating the first error control signal for the feedforward equalizer and the first feedback equalizer. A gate circuit is provided for establishing a connection between the output of the first combiner and an input of the second combiner in response to the presence of the gate control signal and clearing the connection in response to the absence of the gate control signal.

In the presence of an interference transmitted from an undesired source, the canceller of the present invention operates to cancel minimum phase shift fading distortions and interference distortions, and in the absence of the interference, the canceller operates to cancel non-minimum phase shift fading distortions as well as minimum phase shift fading distortions.

Preferably, the first feedback equalizer comprises N delay-line elements connected in series to the output of the data recovery circuit to define N delay-line taps at the outputs of the N delay-line elements for producing N successively delayed versions of the decision output signal, N multipliers for operating on the delayed decision output signals at the N delay-line taps, N correlators responsive to the first error control signal for updating tap-gain coefficients supplied to the N multipliers, and a summing circuit for combining outputs from the N multipliers into a signal for coupling to the second combiner.

Additionally, the second feedback equalizer comprises N delay-line elements connected in series to the output of the data recovery circuit to define (N+1) delay-line taps for producing (N+1) successively delayed versions of the decision output signal at the (N+1) delay-line taps, (N+1) multipliers for operating on the delayed decision output signals at the (N+1) delay-line taps, (N+1) correlators responsive to the second error control signal for modifying signals at the (N+1) delay-line taps for respectively supplying tap-gain signals to the (N+1) multipliers, and a summing circuit for combining outputs from the (N+1) multipliers into a signal for coupling to the first combiner.

BRIEF DESCRIPTION OF THE DRAWINGS

The present invention will be described in further detail with reference to the accompanying drawings, in which:

FIG. 3 is a detailed block diagram of the interference canceller of the present invention; and FIG. 4 shows a typical example of channel impulse response.

DETAILED DESCRIPTION

Figure 1:
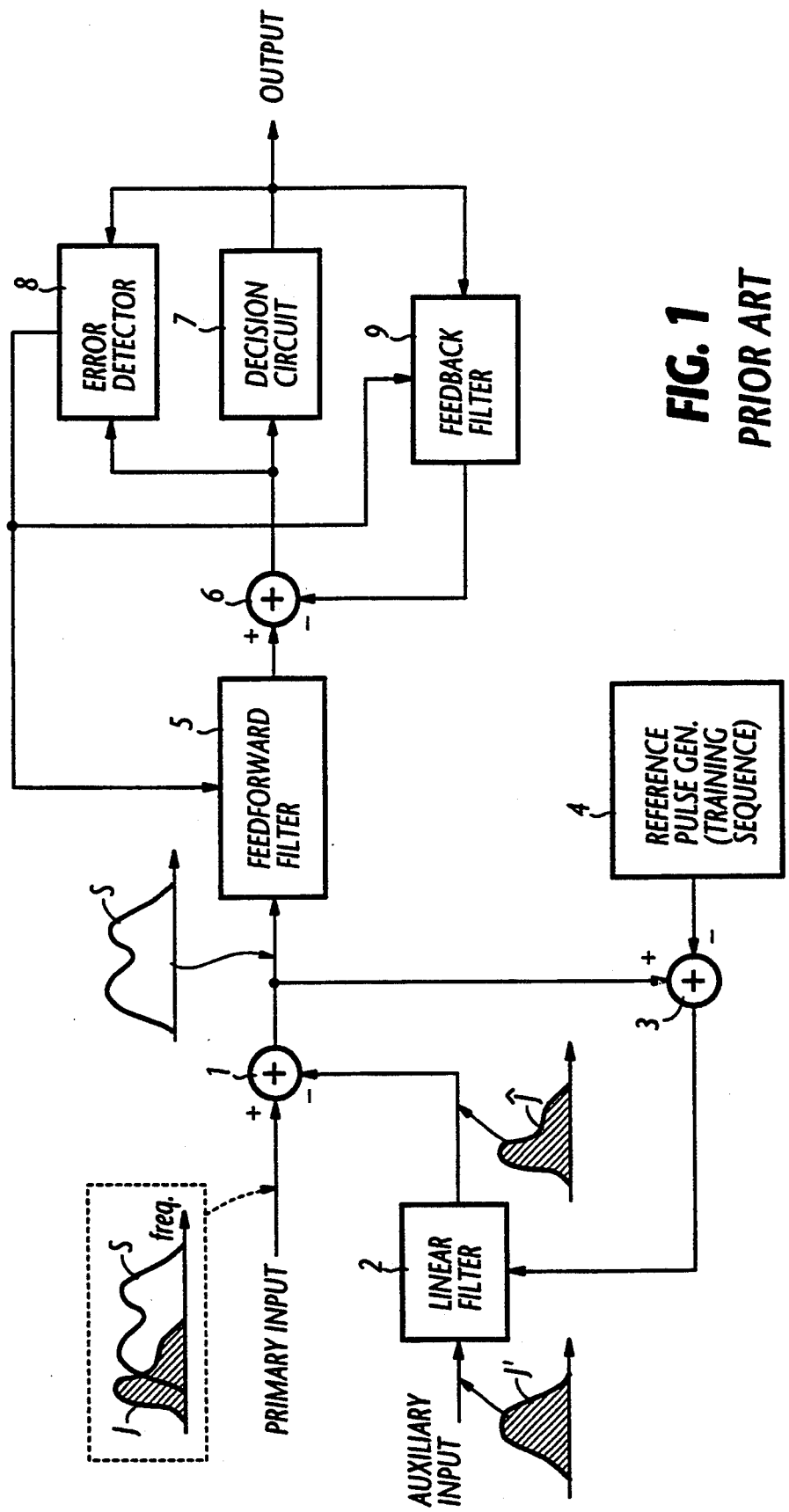
FIG. 1 is a block diagram of a prior art interference canceller.
Figure 2:
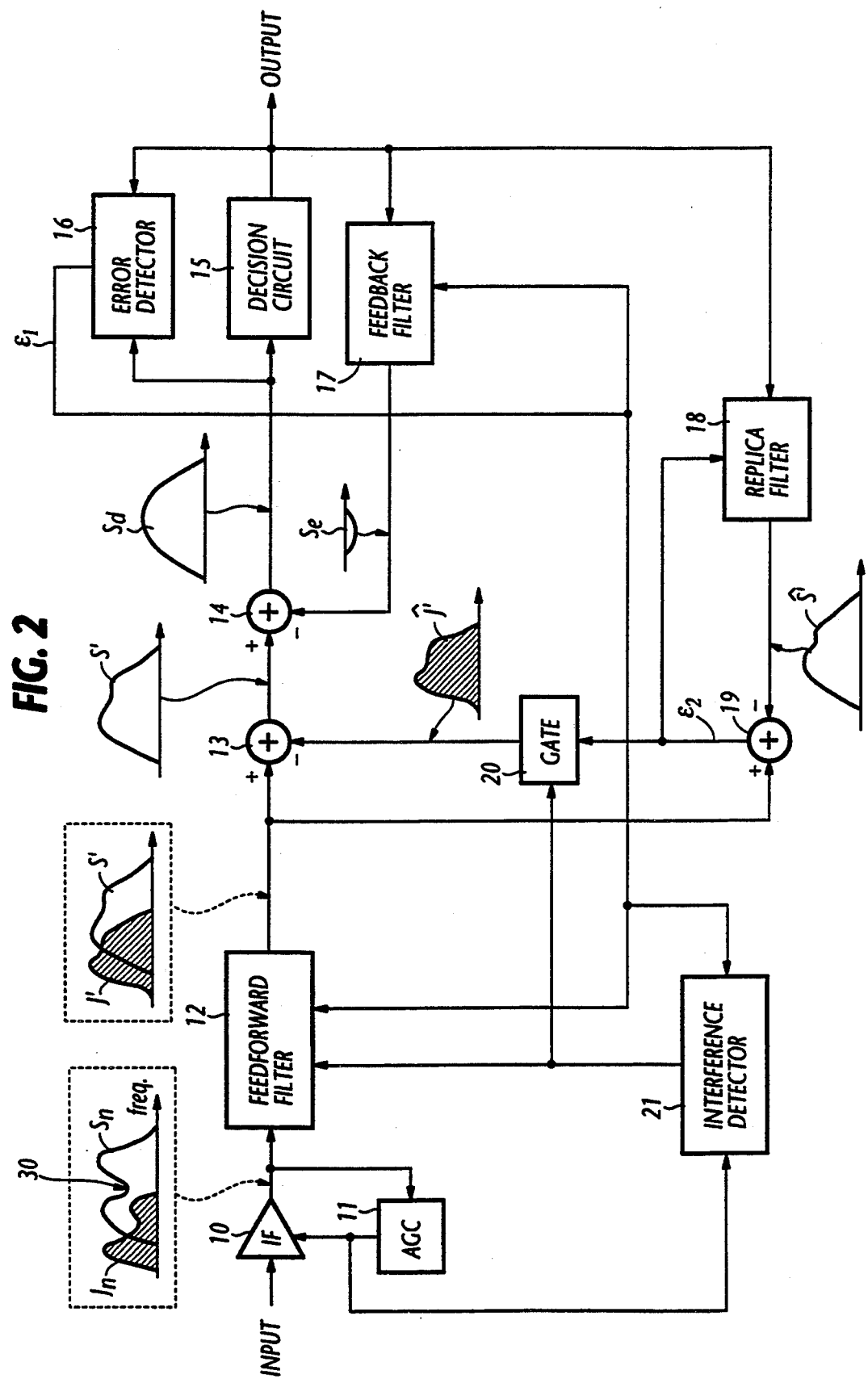
FIG. 2 is a schematic block diagram of an interference canceller according to the present invention.

The interference canceller of the present invention, as represented in FIG. 2, receives a QPSK modulated signal by a single antenna, not shown, and converted to an intermediate frequency signal which is amplified by an IF amplifier 10 whose amplication gain is controlled by an automatic gain control circuit 11. The IF signal is applied to a feedforward transversal filter 12 as a signal containing a desired signal $S_n$ and an interference signal $J_n$. It should be noted that the interference canceller operates equally when the baseband of a transmitted signal is applied to the feedforward filter 12.

The signal (symbol) is transmitted at sampling intervals T and affected by multipath fading and as a result the communication channel from the transmitter to the receiver has a particular channel impulse response as typically shown in FIG. 4. In FIG. 4, the channel response contains the dominant response $h_0$ and delayed components $h_1$, $h_2$, and $h_3$. No components preceding the dominant response $H_0$ are contained since the channel response of long-span multipath fading channels has delayed components. For short-haul channels, the channel response can be approximated on a two-ray (path) propagation model. Therefore, the two-path model is usually used for approximating the effect of multipath fades on different components of a transmitted signal. One is termed a minimum phase shift fading in which the stronger, primary component of the signal arrives earlier than a weaker, secondary component, and the channel impulse response produce postcursors (previous pulses, i.e., samples to the right of reference sample). The other is termed a non-minimum phase shift fading in which the later-arriving, secondary component has a higher signal strength than the earlier-arriving component. In the latter case, the later-arriving component is treated as a primary signal and the earlier-arriving component as an advanced, secondary (undesired) signal, and the channel impulse response produces precursors (future pulses, i.e., samples to the left).

Due to multipath fading, the spectral components of the signal $S_n$ is affected to produce a spectral notch as indicated at 30 in FIG. 2. If the interference signal J from a different transmission source is also affected by multipath fading, a similar spectral notch may appear in the frequency spectrum of the interference signal.

The feedforward filter 12 has a variable number of delay-line taps and operates in a multitap mode or a single tap mode. During a multitap mode, the feedforward filter 12 compensates for precursor distortion that arise when the communication channel is of non-minimum phase shift fading, and during a single tap mode it compensates for postcursors that arise when the communication channel is of minimum phase shift fading.

Feedforward filter 12 produces an output signal $S'+J'$, which applied to the positive input of a subtractor 13 the negative input of which receives an interference estimate $\hat{J}$ from a subtractor 19 via a gate circuit 20 to produce a replica $S'$ of the desired signal. The output of subtractor 13 is connected to the positive input of a subtractor 14, the output of subtractor 14 being coupled to a data recovery, or decision circuit 15 where the original signal is recovered. A feedback transversal filter 17 is connected to the output of decision circuit 15 to compensate for postcursor distortion by supplying an error signal $S_e$ to the subtractor 14. The output of subtractor 14 is an equalized desired signal $S_d$ that is applied to a data recovery, or decision circuit 15 for recovering quantized data signals. The difference between the input and output of the decision circuit 15 is taken by an error detector 16 to produce an error signal $\epsilon_1$. This error signal is applied to the feedforward filter 12 and feedback filter 17 to adaptively update their tap-gain coefficients.

A second feedback filter, or replica filter 18 of transversal structure is connected to the output of the decision circuit 15 for nonlinearly filtering the recovered output signal to produce an estimate $\hat{S}'$ of the desired signal $S'$ appearing at the output of subtractor 13. The estimate $\hat{S}'$ is subtracted by subtractor 19 from the output signal $S'+J'$ of the feedforward filter 12 to provide the interference estimate $\hat{J}$ to subtractor 13 when the gate circuit 20 is closed. The output of subtractor 19 is further applied to replica filter 18 as an error signal $\epsilon_2$ to update its tap gain coefficients.

Further provided is an interference detector 21 which receives the gain control voltage of AGC 11 and the output of error detector 16 to detect the presence of an interfering signal, when the received signal level is high and, at the same time, a substantial amount of error is detected by error detector 16, and produces an interference detect signal. This signal is applied as a gate control signal to both gate circuit 20 and feedforward filter 12.

As shown in FIG. 3, feedforward filter 12 comprises complex delay-line units $40_1$ and $40_2$, each with unit delay time T, connected in series to the output of IF amplifier 10 to define three taps, complex multipliers or weighting devices $41_0$, $41_1$ and $41_2$ for weighting the delayed tap signal samples at the taps of the delay-line 40 with tap-gain signals $c_0$, $c_1$ and $c_2$. These tap-gain signals are respectively derived from complex correlators $42_0$, $42_1$ and $42_2$ by correlations between the error signal $\epsilon_1$ and the delayed tap signal samples. The output of multiplier $41_0$ is delivered to an adder 43 and the outputs of multipliers $41_1$ and $41_2$ are coupled through a normally-closed gate circuit 44 to adder 43. Gate circuit 44 responds to the gate control signal from interference detector 21 by disconnecting the circuits between multipliers $41_1$ and $41_2$ and adder 43. The output of adder 43 is connected to the positive input of both subtractors 13 and 19.

Feedback filter 17 is made up of complex delay-line units $50_1$, $50_2$ and $50_3$ connected in series to the output of decision circuit 15, complex multipliers $51_1$, $51_2$ and $51_3$ for weighting the delayed tap signal samples at the outputs of delay-line units 50 with tap-gain signals $d_1$, $d_2$ and $d_3$ which are respectively derived from complex correlators $52_1$, $52_2$ and $52_3$ by correlations between the error signal $\epsilon_1$ and the delayed tap signal samples. The output of multipliers 51 are delivered to an adder 53 whose output is coupled to the negative input of subtractor 14.

Replica filter 18 includes complex delay-line units $60_1$, $60_2$ and $60_3$ connected in series to the output of decision circuit 15 to define four successive taps, complex multipliers $61_0$, $61_1$, $61_2$, and $61_3$ for weighting the delayed tap signal samples at the taps of delay-line 60 with tap-gain signals $w_0$, $w_1$, $w_2$ and $w_3$ which are respectively derived from complex correlators $62_0$, $62_1$, $62_2$ and $62_3$ by correlations between the error signal $\epsilon_2$ and the delayed tap signal samples. The output of multipliers 61 are delivered to an adder 63 whose output is coupled to the negative input of subtractor 19.

The operation of the interference canceller of the present invention will be described below. In the absence of an interference from an undesired signal source, gate circuit 20 is open and feedforward filter 12 is in a three-tap mode to compensate for precursors arising from non-minimum phase shift fading.

In the presence of an interference from an undesired source, the interference detector 21 produces a gate signal, causing gate circuit 20 to establish a circuit between subtractors 19 and 13 and gate circuit 44 to nullify the outputs of complex multipliers $41_1$ and $41_2$. Feedforward filter 12 is thus switched to a single-tap mode in which its precursor-cancelling capability is reduced to a practically minimum level and the only active tap gain coefficient is $c_0$. In this circuit condition, interference cancellation proceeds as follows to minimize the mean square value of the first error signal $\epsilon_2$ according to the LMS algorithm. The interference is first estimated by taking the difference between the replica filter 18 output and the feedforward filter 12 output by subtractor 19. The value of this estimate is then applied to subtractor 13 where the interference is cancelled, and the intersymbol interference caused by minimum phase shift fading (postcursor distortion) is finally eliminated by feedback filter 17.

Since minimum phase-shift fading is of interest in the interference cancelling mode, the desired symbol $S_i$ of the input signal of the feedforward filter 12 is given by:

$$S_i = \sum_{m=0}^{+\infty} h_m \cdot a_{i-m} \quad (1)$$

where, $h_i$ is the impulse response for a symbol $a_i$ of a transmitted symbol sequence $\{a_n\}$ and m is index of filter delay-line taps. In the case of practical minimum phase-shift fading, however, the recovered clock timing tends to deviate from the optimum timing and the received signal is impaired as if it were affected by precursors. Therefore, the feedforward filter 12 operates in a single-tap (practically minimum tap count) mode to cancel such precursors.

Since the feedforward filter 12 provides multiplication of $S_n + J_n$ with tap-gain coefficient $c_0$, the output of the filter 12 would appear as consisting of a desired symbol $S'$ plus an interference component $J'$ and the symbol at sample instant i is given as follows.

$$S_i' = \sum_{m=0}^{\infty} c_0 \cdot h_m \cdot a_{i-m} \quad (2)$$

The interference wave component $J_i'$ is given as:

$$J_i' = c_0 \cdot J_i \quad (3)$$

If the channel impulse response can be approximated with three symbol intervals (3T) as shown in FIG. 4, the replica filter 18 must be provided with four delay-line taps, as illustrated in FIG. 3, at which symbols $\hat{a}_0$, $\hat{a}_{-1}$, $\hat{a}_{-2}$ and $\hat{a}_{-3}$ appear, respectively. Note that, at this instant, symbols $\hat{a}_{-1}$, $\hat{a}_{-2}$ and $\hat{a}_{-3}$ also appear, respectively, at the taps of feedback filter 17.

If a symbol $a_0$ appears the output of decision circuit 15, the output of the replica filter 18 is represented as:

$$S_0' = \sum_{m=0}^{3} w_m \cdot a_{0-m} \quad (4)$$

If the relation $\hat{a}_i = a_i$ holds, from Equations (2), (3) and (4), the error signal $\epsilon_2$ is obtained as follows:

$$\epsilon_2 = \sum_{m=0}^{3} (c_0 \cdot h_m - w_m) a_{0-m} + c_0 \cdot j_i \quad (5)$$

The tap-gain values $w_m$ of replica filter 18 that minimize the mean square value of error $\epsilon_2$ can be obtained by the Wiener-Hopf Equation. Since the tap gain coefficients are of complex values, their normal equations can be easily obtained with the orthogonality principle as follows:

$$E[\epsilon_2 \cdot \hat{a}_i] = 0 \quad (6)$$

where E is the expected value. Therefore, the following normal equation is obtained:

$$c_0 \cdot h_m = w_m \quad (7)$$

where m = 0, 1, 2 and 3.

This normal equation represents the multiplication of the tap coefficient $c_0$ of the reference tap with symbols affected by the channel impulse response. Substituting Equation (7) into Equation (5) gives the following:

$$\epsilon_2 = c_0 \cdot J_i \quad (8)$$

Thus, the spectral energy densities of the interference estimate $\hat{J}'$ are matched with those of interference component $J'$. By subtracting the output of the subtractor 19 from the output of the feedforward filter 12 by subtractor 13, the interference component $J'$ can be removed. Since the time taken to derive the interference estimate $\hat{J}'$ from interference component $J'$ is negligibly small in comparison with the rate of variations of the interference component, interference cancelling can be achieved without delay. That is, the present invention is able to cancel wideband interference waves.

As described above, even when the transmission path has minimum phase shift fading, a certain amount of precursors exists in the channel response. If feedforward filter 12 were to be operated in a three-tap mode in the presence of interference, it would produce an output containing a component contributed from convolution of symbols $a_{+1}$ and $a_{+2}$ that are transmitted after symbol $a_0$ and precursors with tap-gain coefficients $c_1$ and $c_2$. On the other hand, no symbols would appear at every tap of replica filter 18 corresponding to symbols $a_{+1}$ and $a_{+2}$. A substantial amount of error between component S' and the symbol estimate Ŝ' would be fed into decision circuit 15. If the transmission path may have non-minimum phase shift fading characteristic giving rise to precursors in the received signal which is also contaminated by an interference from an undesired signal source, a certain amount of such precursors may not be cancelled. However, the cancellation of both postcursors (minimum phase shift fading distortion) and wideband interference distortion with a minimum feedforward filter tap outweighs the loss of cancellation of some precursors.

As described in the foregoing, the present invention eliminates the need for an auxiliary antenna or a diversity antenna. Since only one antenna is used for cancelling interference, undesired cancellation of desired signals is avoided. Since the replica filter provides nonlinear filtering of recovered symbols, the undesired effect of noise enhancement is completely eliminated. Furthermore, the transmission efficiency can be improved by the elimination of training sequence.

What is claimed is:

1. An interference canceller comprising:
    means for detecting an interference signal transmitted from an undersired source for generating a gate control signal when the interference signal is detected;
    a feedforward equalizer for operating on a signal received by an antenna and producing an equalized feedforward output signal, said feedforward equalizer comprising (N−1) delay-line elements connected in series to define N delay-line taps for producing successively delayed versions of said received signal at said N delay-line taps, N multipliers for operating on the delayed signals at said delay-line taps, N correlators responsive to a first error control signal for modifying signals at said delay-line taps for respectively supplying tap-gain signals to said multipliers, summing means for combining outputs from said N multipliers into said equalized feedforward output signal, and means for nullifying the outputs of (N−1) ones of said N multipliers in response to said gate control signal;
    a decision circuit for deriving a decision output signal from an equalized desired signal;
    a first feedback equalizer for operating on decision output signals from said decision circuit in accordance with said first error control signal;
    a second feedback equalizer for nonlinearly filtering decision output signals from said decision circuit in accordance with a second error control signal for generating an estimate of a desired component of said equalized feedforward output signal;
    a first combiner for combining outputs from said second feedback equalizer and said feedforward equalizer and producing and supplying an estimate of an undesired component of said equalized feedforward output signal to said second feedback equalizer as said second error control signal;
    a second combiner for combining outputs from said first combiner, said feedforward equalizer and said first feedback equalizer and generating said equalized desired signal for said decision circuit;
    means responsive to a difference between the outputs of said second combiner and said decision circuit for generating said first error control signal for said feedforward equalizer and said first feedback equalizer; and
    gate means for establishing a connection between the output of said first combiner and an input of said second combiner in response to the presence of said gate control signal and clearing said connection in response to the absence of said gate control signal.

2. An interference canceller as claimed in claim 1, wherein said first feedback equalizer comprises:
    N delay-line elements connected in series to the output of said decision circuit to define N delay-line taps at the outputs of the N delay-line elements for producing N successively delayed versions of the decision output signal;
    N multipliers for operating on the delayed decision output signals at said N delay-line taps;
    N correlators responsive to said first error control signal for modifying signals at said N delay-line taps for respectively supplying tap-gain signals to said N multipliers; and
    summing means for combining outputs from said N multipliers into a combined signal and supplying the combined signal to said second combiner.

3. An interference canceller as claimed in claim 1, wherein said second feedback equalizer comprises:
    N delay-line elements connected in series to the output of said decision circuit to define (N+1) delay-line taps for producing (N+1) successively delayed versions of the decision output signal at said (N+1) delay-line taps;
    (N+1) multipliers for operating on the delayed decision output signals at said (N+1) delay-line taps;
    (N+1) correlators responsive to said second error control signal for modifying signals at said (N+1) delay-line taps for respectively supplying tap-gain signals to said (N+1) multipliers; and
    summing means for combining outputs from said (N+1) multipliers into a combined signal and supplying the combined signal to said first combiner.

4. An interference canceller as claimed in claim 2, wherein said second feedback equalizer comprises:
    N delay-line elements connected in series to the output of said decision circuit to define (N+1) delay-line taps for producing (N+1) successively delayed versions of decision output signal at said (N+1) delay-line taps;
    (N+1) multipliers for operating on the delayed decision output signals of said (N+1) delay-line taps;
    (N+1) correlators responsive to said second error control signal for modifying signals at said (N+1) delay-line taps for respectively supplying tap-gain signals to said (N+1) multipliers; and
    summing means for combining outputs from said (N+1) multipliers into a combined signal and supplying the combined signal to said first combiner.

* * * * *